United States Patent
Chang et al.

(10) Patent No.: US 8,773,789 B1
(45) Date of Patent: Jul. 8, 2014

(54) IN-CHANNEL CHANNEL OPTIMIZATION FOR HARD-DISC DRIVE READ/WRITE CHIPS

(71) Applicant: LSI Corporation, San Jose, CA (US)

(72) Inventors: Wu Chang, Sunnyvale, CA (US); Parviz Rahgozar, Cupertino, CA (US); Ming Jin, Fremont, CA (US); Haitao Xia, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/767,317

(22) Filed: Feb. 14, 2013

(51) Int. Cl.
*G11B 27/36* (2006.01)
*G11B 20/10* (2006.01)

(52) U.S. Cl.
USPC .............................. 360/31; 360/39

(58) Field of Classification Search
None
See application file for complete search history.

(56) References Cited

U.S. PATENT DOCUMENTS

| | | | |
|---|---|---|---|
| 5,761,212 A * | 6/1998 | Foland et al. | 360/31 |
| 6,208,477 B1 | 3/2001 | Cloke et al. | |
| 6,292,912 B1 | 9/2001 | Cloke et al. | |
| 6,662,253 B1 * | 12/2003 | Gary et al. | 710/244 |
| 6,697,976 B1 * | 2/2004 | Satoh et al. | 360/65 |
| 7,949,908 B2 | 5/2011 | Yoel et al. | |
| 8,156,400 B1 | 4/2012 | Yeo et al. | |
| 2005/0264910 A1 * | 12/2005 | Lee | 360/69 |
| 2008/0007854 A1 * | 1/2008 | Lin et al. | 360/39 |
| 2008/0007855 A1 * | 1/2008 | Vityaev et al. | 360/51 |
| 2008/0007861 A1 * | 1/2008 | Park et al. | 360/75 |
| 2008/0037158 A1 * | 2/2008 | Kim et al. | 360/78.14 |
| 2009/0231751 A1 * | 9/2009 | Asakura et al. | 360/73.01 |
| 2010/0328800 A1 * | 12/2010 | Sakai et al. | 360/31 |
| 2011/0141599 A1 * | 6/2011 | Yasuna et al. | 360/31 |
| 2013/0182347 A1 * | 7/2013 | Maeto | 360/39 |
| 2013/0201579 A1 * | 8/2013 | Springberg et al. | 360/75 |

* cited by examiner

*Primary Examiner* — Thang Tran
(74) *Attorney, Agent, or Firm* — Mendelsohn, Drucker & Dunleavy, P.C.; Steve Mendelsohn

(57) ABSTRACT

In one embodiment, a read/write chip for a hard disc drive has at least one on-chip, in-channel, hardware-based optimization processor that is part of one or more channels (e.g., read, write, and/or servo) of the read/write chip. The optimization processor can iteratively evaluate the performance of a channel for different values of one or more different parameters that control channel processing by generating an appropriate metric value for each different parameter value. The optimization processor can then select an optimal parameter value for subsequent channel processing.

10 Claims, 2 Drawing Sheets

IN-CHANNEL CHANNEL OPTIMIZATION FOR HARD-DISC DRIVE READ/WRITE CHIPS

BACKGROUND

1. Field

The disclosure relates to read/write chips for hard disc drives (HDDs) and, more specifically but not exclusively, to the optimization of channels, such as read, write, and/or servo channels, for HDD read/write chips.

2. Description of the Related Art

This section introduces aspects that may help facilitate a better understanding of embodiments of the invention. Accordingly, the statements of this section are to be read in this light and are not to be understood as admissions about what is prior art or what is not prior art.

In a hard disc drive (HDD), the write channel of a read/write chip generates a write signal that a write head uses to store data onto an associated hard disc, an associated read head subsequently generates a read signal corresponding to that stored data, and the read channel of the read/write chip converts that read signal into a recovered data signal that ideally accurately reflects the data stored on the hard disc. A conventional HDD read/write chip implements parameter-driven read-channel processing whose parameter values can be configured, e.g., by the chip manufacturer and/or by the chip manufacturer's customer who assembles the chip into an HDD. The channel processing of a conventional HDD read/write chip can be optimized using off-chip electronics (e.g., programmable processor-based test equipment) that analyze the recovered data signals (and possibly other chip I/O (input/output) data that is accessed off chip via customer-available I/O ports of the chip's user interface) for different sets of channel parameter values to determine an optimal set of channel parameter values for that chip. Such off-chip electronics are typically implemented as a programmable processor executing software and/or firmware designed to perform the optimization analysis for the channel processing.

SUMMARY

In one embodiment, the invention is an apparatus comprising a read/write chip for a hard disc drive having a read/write head. The chip comprises a servo channel configured to control operations of the read/write head, a write channel configured to generate a write data signal used by the read/write head to store data on a hard disc of the hard disc drive, a read channel configured to process a read data signal generated by the read/write head to generate recovered data representative of the data stored on the hard disc, and at least one optimization processor that is part of at least one channel of the servo, write, and read channels. The at least one optimization processor is configured to (i) analyze processing of the at least one channel for a plurality of different parameter values for one or more different channel parameters and (ii) select an optimal parameter value for each channel parameter.

Additional embodiments of the invention are described in the application including the claims.

BRIEF DESCRIPTION OF THE DRAWINGS

Other embodiments of the invention will become more fully apparent from the following detailed description, the appended claims, and the accompanying drawings in which like reference numerals identify similar or identical elements.

DETAILED DESCRIPTION

Figure 1:
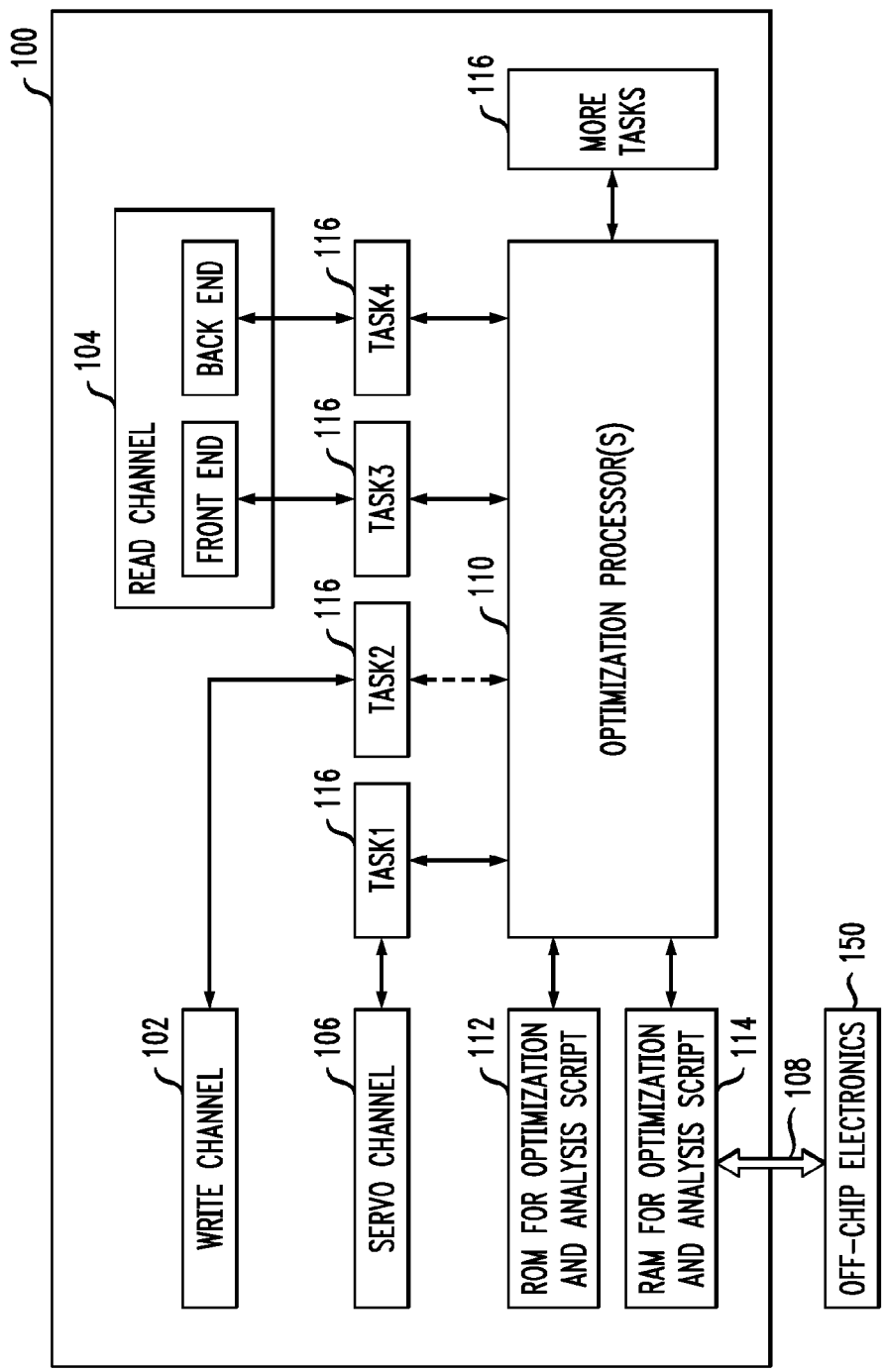
FIG. 1 shows a high-level, simplified block diagram of a read/write chip for a hard disc drive (HDD)

FIG. 1 shows a high-level, simplified block diagram of a read/write chip 100 for a hard disc drive (HDD). As shown in FIG. 1, read/write chip 100 has write channel 102, read channel 104, and servo channel 106. As in conventional read/write chips, write channel 102 generates write signals for one or more write heads (not shown) to store data on one or more corresponding hard discs (not shown), read channel 104 processes read signals from one or more read heads (not shown) to generate recovered data signals representing the stored data, and servo channel 106 controls the positioning and other operations of the write and read heads.

Read/write chip 100 has a user interface 108 that enables (e.g., programmable) off-chip electronics 150 to read and write certain types of data to and from the chip. For example, user interface 108 enables a user to configure the processing of channels 102, 104, and/or 106 by setting the values of certain programmable parameters stored in read/write chip 100. In addition, the user uses user interface 108 to write data to and read data from one or more hard discs.

Read/write chip 100 also contains at least one on-chip, hardware-based optimization processor 110 that is part of one or more of the on-chip channels (i.e., write channel 102, read channel 104, and/or servo channel 106). Being part of an on-chip channel means that optimization processor 110 has access to data corresponding to the channel processing that is not available off chip. Thus, for read channel 104, optimization processor 110 would have access to read-channel data that is not available by off-chip electronics that access read/write chip 100 via user interface 108.

In addition, optimization processor 110 is also capable of setting the values of certain programmable parameters that control channel processing and analyzing the performance of that channel processing for different sets of parameter values. As shown in FIG. 1, read/write chip 100 has memory, such as read-only memory (ROM) 112 and random access memory (RAM) 114, that can be used to store reconfigurable analysis and optimization scripts that are implemented by optimization processor 110 to analyze the performance of channel processing for different sets of parameter values. In one implementation, ROM 112 would be used to store a set of default or baseline optimization scripts, while RAM 114 would be available to store patches for the default scripts or other non-default functions and flows 116.

Based on the results of that analysis, optimization processor 110 automatically selects .a set of one or more parameter values that provides optimal channel processing performance. In this way, optimization processor 110 may be said to be configured to perform in-channel channel optimization.

Being "hardware-based" means that optimization processor 110 has a hardware processing core (not shown) that is specifically designed to perform certain hard-coded functions. One possible hard-coded function is a parameter sweep in which a channel operation is iteratively performed while sweeping the value of a particular channel control parameter from a specified initial (e.g., minimum) value to a specified final (e.g., maximum) value, while stepping at a specified increment between iterations, to determine an optimal value for that control parameter. Although this linear sweep function is implemented by the hardware processing core, optimization processor 110 may have control logic (not shown) that implements firmware scripts that (i) identify the particular channel control parameter being swept and (ii) specify the initial and final values and the increment value for that control parameter. Such an optimization processor is still referred to as being hardware-based because of its hardware processing core.

Because optimization processor 110 is part of a channel and therefore has access to data that is not available off chip, its analysis and optimization processing can be more accurate and more reliable than conventional processing performed by off-chip electronics based on a more-limited set of user-available I/O data. Furthermore, when optimization processor 110 is a hardware-based processor, its analysis and optimization processing can be faster than the software- or firmware-based processing implemented by conventional off-chip electronics. Note that employing hardware-based optimization processors enable optimization processing to be implemented in parallel, thereby further increasing the processing speed compared with conventional serial processing. In addition to implementing optimization routines, hardware-based optimization processors can have intelligent functions built in, which may be stored in ROM for later programming. Such intelligent functions may include, without limitation, optimization by multi-dimensional gradient searching, concurrent front-end and back-end optimization, and back-end code selection optimization in addition to the linear sweep function described previously.

Multi-dimensional gradient searching can be used to jointly optimize n parameters $\{A1, A2, \ldots, An\}$ in a system. One possible gradient searching method is as follows:
(1) Initialize the n parameters as $\{A1, A2, \ldots, An\}=\{x1, x2, \ldots, xn\}$.
(2) Determine an initial value for the optimization metric, in this case, BER, as follows:
  (a) Write_register (address of $\{A1, A2, \ldots, An\}$, $\{x1, x2, \ldots, xn\}$)—store the initial parameter values for use by read channel 104.
  (b) Read_sectors (sector number)—use read channel 104 to read data from a hard disc using the initial parameter values.
  (c) Determine BER value and save as BER1.
(2) For each of the n parameters, steps (1)(a)-(c) are repeated for two perturbations in opposite directions to determine BER values: $\{A1, \ldots, Ai, \ldots, An\}=\{x1, \ldots, xi+\Delta, \ldots, xn\}$ and $\{A1, \ldots, Ai, \ldots, An\}=\{x1, \ldots, xi-\Delta, \ldots, xn\}$, for i=1 to n, where $\Delta$ has a predefined searching granularity. As such, there are a total of 2n perturbations. The minimum BER for the 2n perturbations is determined and saved as BER2 along with the corresponding perturbed set of n parameter values.
(3) If BER2<BER1, then set BER1=BER2 and repeat step (2) using the corresponding perturbed set of n parameter values to determine a new value for BER2.
(4) If BER2>=BER1, then the previous set of n parameter values is determined to be the optimal set and the search is terminated.

This is just one possible example of multi-dimensional gradient searching, where each perturbation is completely linear, affects only one parameter at a time, and has the same granularity. Alternative implementations may involve non-linear perturbations, multi-parameter perturbations, and/or different granularities for different parameters.

Figure 2:
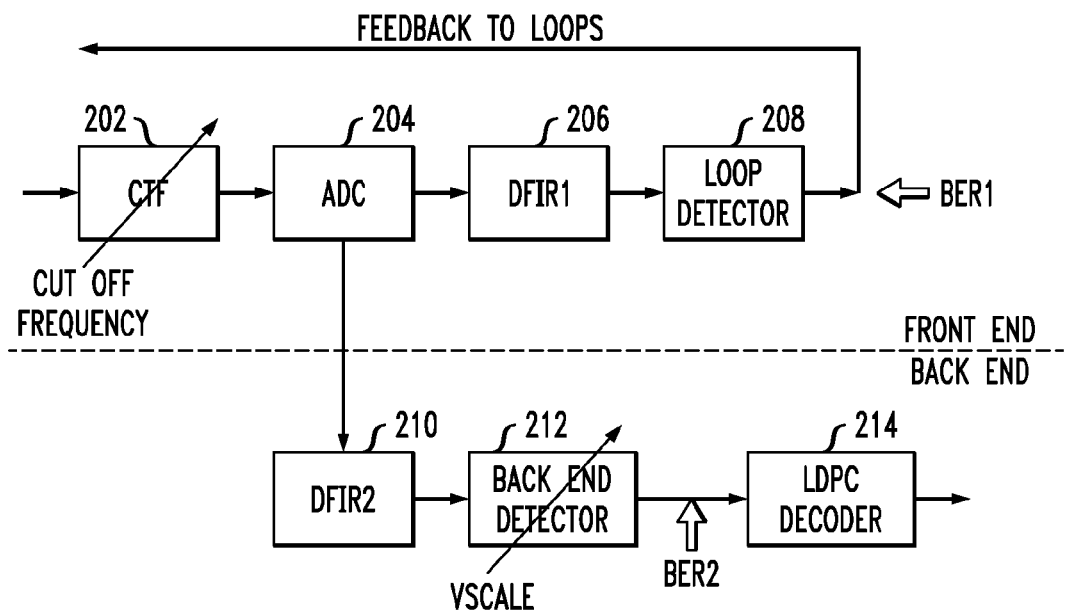
FIG. 2 shows a functional block diagram of portions of front-end and back-end processing associated with one possible example of concurrent front-end/back-end optimization for the read channel of FIG. 1.

In concurrent optimization, two or more parameters are optimized in parallel. For example, in concurrent front-end and back-end optimization, at least one parameter associated with front-end processing of read channel 104 is optimized at the same time as the optimization of at least one parameter for back-end processing of read channel 104. FIG. 2 shows a functional block diagram of portions of front-end and back-end processing associated with one possible example of concurrent front-end/back-end optimization. In FIG. 2, low-pass filter (LPF) 202, analog-to-digital converter (ADC) 204, digital finite impulse response (DFIR) filter 206, and loop detector 208 are part of the front-end processing, while DFIR 210, back-end detector 212, and low-density parity-check (LDPC) decoder 214 are part of the back-end processing. As indicated in FIG. 2, the cut-off frequency CTF applied by low-pass filter 202 as part of the front-end processing and the scale factor vscale applied by back-end detector 212 are parameters that can be adjusted to optimize performance of both the front-end processing and the back-end processing.

In the absence of optimization processor 110, the cut-off frequency CTF can be swept across an operating range (e.g., from 20% to 40% of the channel data rate at 2% increments), determining the front-end bit-error rate BER1 at each different CTF value to select the CTF value that produces the minimum BER1 value. Using that "optimal" CTF value, the scale factor vscale can then be swept across its operating range (e.g., incrementing from 1 to 15), determining the back-end bit-error rate BER2 at each different vscale value to select the vscale value that produces the minimum BER2 value.

With optimization processor 110, BER1 and BER2 can be observed at the same time. As such, the cut-off frequency CTF and the scale factor vscale can be swept concurrently. For example, the first iteration could have CTF=20% and vscale=1, the second iteration could have CTF=22% and vscale=2, the third iteration could have CTF=24% and vscale=3, and so on. BER1 is still observed to optimize CTF for the front-end LPF 202, but both BER1 and BER2 are observed to optimize vscale for the back-end detector 212. In this way, once CTF is optimized based on BER1, further iterations can be performed by adjusting vscale to complete its optimization based on BER2.

Note that this concurrent optimization is based on the assumption that the two parameters (e.g., CTF and vscale) are independent. Concurrent optimization enables front-end and back-end parameters to be optimized in parallel, thereby saving time.

Back-end code selection optimization refers to the selection of a particular encoding scheme used to encode the user data when it is stored on a hard disc. In one implementation of read/write chip 100 of FIG. 1, write channel 102 and read channel 104 are configured to respectively encode and decode data using low-density parity-check (LDPC) coding based on a particular LDPC code matrix selected from a number of different, available matrices. Optimization processor 110 enables the bit-error rates for the user data and for the parity data generated using different LDPC code matrices to be analyzed separately, which can improve the process of selecting an optimal LDPC code matrix.

Figure 3:
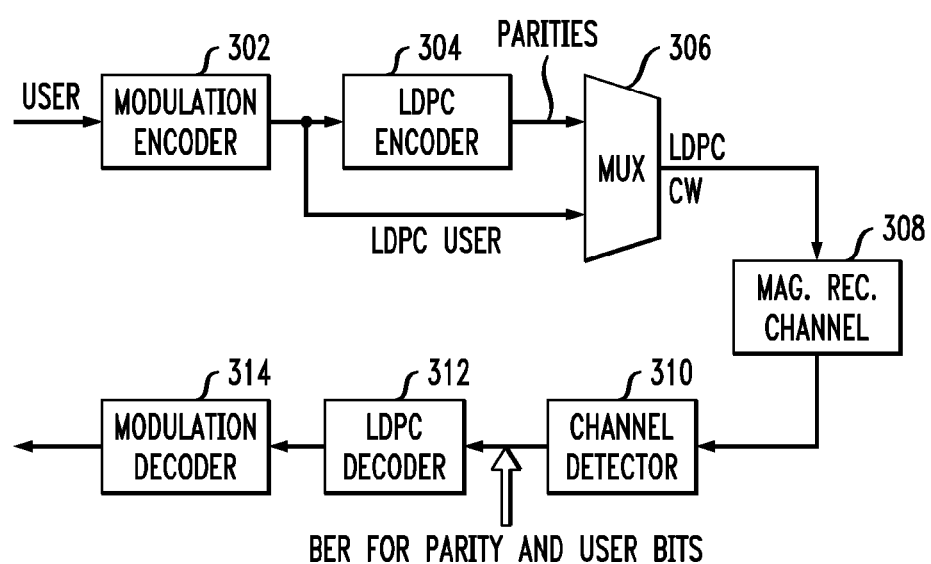
FIG. 3 shows a functional block diagram of one possible data processing architecture for the read/write chip of FIG. 1.

FIG. 3 shows a functional block diagram of one possible data processing architecture for read/write chip 100 of FIG. 1. In particular, (i) modulation encoder 302, LDPC encoder 304, and multiplexer (mux) 306 are part of write channel 102, (ii) magnetic recording channel 308 is the hard disc, and (iii) channel detector 310, LDPC decoder 312, and modulation decoder 314 are part of read channel 104. As indicated in FIG. 3, optimization processor 110 would be able to monitor the read-channel processing to determine and analyze the bit-error rates for user data separate from the bit-error rates for parity data for different LDPC code matrices, in addition to monitoring the total bit-error rates. As indicated previously, the ability to monitor user and parity data bit-error rates separately can result in a better selection of the LDPC code matrix for on-line operations.

Optimization processor 110 can be designed to enable user access to the optimization processing by storing optimization routines and/or parameters in ROM 112 and/or RAM 114, where the user could be the chip manufacturer and/or the manufacturer's customer.

As described briefly above, configuring read/write chip 100 with at least one optimization processors 110 can provide high speed, high reliability, high efficiency, and high intelligence.

With regard to high speed, optimization processor 110 can directly get channel information without relying on user interface 108, which is defined for the manufacturer's customer. Since optimization processor 110 can get information from any point in a channel, parallel optimization can be achieved for any two or even all three of the write, read, and servo channels. In addition, optimization processor 110 can perform directional searches, such as target search and all searches for correlated parameters, instead of exhaustively sweeping all possible combinations.

With regard to high reliability, optimization processor 110 can get signals from the channel in real time, e.g., for miss sync, false sync, and media defect analysis. During normal read-channel operations, data can be accurately recovered from the read signal after the read head has been properly synchronized with the spinning hard disc. If, for some reason, synchronization cannot be achieved, then a "miss sync" condition exists, and the read channel generates a "miss sync" signal. If the read head mistakenly thinks it has achieved synchronization, then a "false sync" condition exists, and the read channel generates a "false sync" signal. Specific sectors of a hard disc may have physical defects (e.g., thermal asperity) that prevent them from reliably storing data. If a media defect exists, then a "media defect" condition exists, and the read channel generates a "media defect" signal. Since it is part of the read channel, optimization processor 110 monitors these different signals generated as part of read-channel processing to detect one of these conditions. Optimization processor 110 can then safely ignore the read signals when any of those conditions occur when determining an optimal value for a control parameter. As a result, it is very easy to discard "garbage" sectors on-the-fly and keep reliable optimization results. With optimization processor 110, using known data patterns is not necessary for channel optimization, which makes the optimization processing run more closely to real operation.

With regard to high efficiency, all channel information is available for optimization processor 110, instead of the single channel output provided by user interface 108. As a result, many different observations can be made from one run. For example, with a known pattern written on a disc, optimization processor 110 can monitor the soft and hard decisions to determine the error rate for each global iteration of an iterative decoder, such as a low-density parity-check (LDPC) decoder. In this way, error statistics and histograms for different global iterations can be obtained in one run. Furthermore, since use of known data patterns is not required, optimization processor 110 can use channel memory to buffer the soft and hard information for each sector and each global iteration. Once the LDPC decoder converges, optimization processor 110 computes all error rates for the related sector.

With regard to high intelligence, optimization processor 110 can be made very intelligent for channel optimization and further channel performance investigation. In other words, optimization processor 110 can perform not only optimization routines, but also data analysis and automatic strategy changes. Furthermore, optimization processor 110 can implement optimization routines based on indirect metrics computed from channel information. Optimization processor 110 can help to run extra training steps to have high quality metrics for later optimization procedures. For example, at very poor SNR (signal-to-noise) regions (or poor channel conditions), for Viterbi BER (bit-error rate) analysis, LDPC decoder cannot be relied on to give error-free NRZ (non-return to zero) patterns. Instead, LLR (log-likelihood ratio) quality is measured to match the real BER. Optimization processor 110 can find/adapt a good LLR threshold for the LLR quality measurement.

From a possible list, optimization processor 110 verifies and/or identifies if the parameters that are optimizing are correlated, i.e., changing one parameter may change the optimal point of another parameter. Optimization processor 110 can be configured to implement multi-dimensional gradient or linear searching for correlated parameters.

Optimization processor 110 can be configured to partially implement front-end and back-end optimization in parallel. For example, front-end parameter change may directly reflect a change in the Viterbi (loop or the first iteration of back-end) BER, but the back-end scaling factor may continue to perform a linear search. If the Viterbi BER stays the same or gets worse, but a later iteration or final SFR (sector failure rate) still gets better, it obviously turns out that the back-end scaling factor is improving. Many more comprehensive strategies like this could be developed to make optimization processor 110 smarter.

Optimization processor 110 can be configured to perform analysis (e.g., compute metrics) for LDPC user data and parity data separately, which may be important when modulation codes are not used to protect LDPC parity data. Furthermore, when multiple LDPC codes, having different error correction capabilities on parity bits, are available in a channel, configuring optimization processor 110 to compute different metrics for user data and parity data can help make the choice of LDPC code used in the channel and can also be important for further investigation of the read channel.

Optimization processor 110 enables simplified, high-speed optimization procedures to perform minor adjustments on the fly. In this way, optimization processor 110 supports both off-line and on-line use.

Optimization processor 110 can be configured to optimize a channel by determining optimal values for one or more of the control parameters for that channel. For example, for write channel 102, optimization processor 110 can be configured to optimize the write precompensation (WPC) circuit (not shown). The write channel uses the WPC circuit to shift the nominal position of the write pulses to compensate for nonlinearities due to demagnetizing fields in the magnetic medium. The WPC circuit produces a programmable pattern-dependent delay for each transition it writes. The delay selection is based on the three previous NRZ symbols and the current symbol. For a transition to occur, the previous NRZ symbol is always the complement of the current symbol, so there are a total of eight possible symbol patterns associated with a transition. The WPC circuit groups these patterns in pairs and refers to them as the NOMR[5:0], NOMF[5:0], LATE0R[5:0], LATE0F[5:0], LATE1R[5:0], LATE1F[5:0], LATE2R[5:0], and LATE2F[5:0] bit fields. The WPC circuit refers to each pattern as either a rising (R) or falling (F)

pattern depending on whether the current NRZ symbol is a 1 or 0, respectively. The WPC circuit applies a unique 6-bit unsigned delay value to the current symbol of each of the eight different NRZ patterns.

For read channel 104, optimization processor 110 can be configured to optimize one or more of the following parameters:

ACCR: AC-coupling (ACC) gap recovery setting. The ACCR bit field controls the ACC stage during DC gap recovery when transitioning from servo to read events. When read mode DC gap recovery is enabled, the ACCR bit field specifies the ACC time constant that controls the ACC stage DC gap recovery;

CTFFR: Continuous time filter (CTF) cutoff/pole frequency for read mode;

ZFR: CTF boost programming in read mode;

Target: Equalization target of the partial response (PR) channel;

ECWIN: The FIR samples (e.g., DFIR output), together with the error signal from the Loop soft output Viterbi algorithm (SOYA), pass through an error-compensation block and delay before serving as input to the back-end channel detector (SOYA). Because error compensation removes the near-DC noise associated with perpendicular recording, it reduces the effect of DC noise on the performance of the back-end SOYA. The error compensation has a programmable moving average window length (DA) that can be programmed to 32, 64, 84, 100, or 128 by setting the ECWIN[2:0] bit field to 1, 2, 3, 4, or 5, respectively. Setting ECWIN[2:0] to 0 turns off the error compensation. Hard decisions from the Loop SOYA are used to calculate the error signal used in the error-compensation block to subtract off the DC noise.

VSCALE: VSCALE enhances the effect of the signal-dependent variance in the branch metrics. VSCALE scales the signal-dependent standard deviation, which is related to the magnitude of the first tap for each of the 8 noise prediction (NP) FIR filters. VSCALE does not significantly change the precision and saturation levels of the branch metrics inside the detector relative to the precision of the NP FIR filter output. VSCALE is selected to optimize the final bit-error rate.

VSCALE_LLR: The VSCALE_LLR[3:0] bit field scales the internal soft-output of the channel detector, so that the soft-output that leaves the detector has squared Euclidean distance scaled by $1/(2\,\text{var\_llr})$, where var_llr is proportional to/computed from vscale_llr. The soft-input of the channel detector is scaled by an inverse scaling factor when it enters the detector. Because the number of bits in the external soft-decisions seen by the LDPC decoder is significantly smaller than the number of bits used to represent the soft-decisions inside the detector, VSCALE_LLR[3:0] provides a means to adjust which bits are sent to the LDPC decoder; and NLTAPR: Non-linear tap in read mode for MRA (magnetic recording asymmetry) correction (MRAC), where $\text{MRAC}=40\% \times (\text{NLTAPR}[7:2])/31 \times \text{Vin}/250$ mVdp-p, where $\text{MRAC}=(A-B)/(A+B)$, A and B are the magnitudes of the positive and negative head peak voltages, {MRAC=2×(second harmonic)/fundamental}.

For servo channel 106, optimization processor 110 can be configured to optimize one or more of CTF cutoff/boost, gain loop update speed (update gain), DFIR coefficients. For the servo channel, exemplary optimization parameters include CTFFS, NLTAPS, and GUGS, where CTFFS and NLTAPS are very similar to CTFFR and NLTAPR described previously. Note that, for the servo channel, NLTAPS[5:0] is substituted for NLTAPR[7:2] in the equation for MRAC described previously. GUGS is the VGA (variable gain amplifier) control update gain in servo mode, where GUG stands for gain-update-gain.

The parameters described above are just examples of the types of parameters that can be optimized for specific implementations of read/write chips. Other read/write chip implementations can have different parameters that can be optimized.

The following is exemplary pseudo code for optimization processor 110 for a generic read channel parameter that is optimized based on a generic measure metric:

1 Enable optimization engine
2 Reset metric
3 Point to a SIF register based on sweep register address
4 For ivalue=start_value: step: end_value
5 WR_SIF(address, ivalue)
6 RD_sector(sector number)
7 Collect metric
8 End
9 Select optimal ivalue based on collected metrics
10 WR_SIF(address, optimal_ivalue)

In line 1, optimization processor 110 is enabled. In line 2, the metric is reset (to either an arbitrary high or low value depending on whether low or high values of the metric indicate optimal performance). In line 3, optimization processor 110 is pointed to a SIF (serial interface) register based on a specified sweep register address. In lines 4-8, different values (ivalue) for the channel parameter are iteratively selected from an initial value (start_value) to a final value (end_value) at specified increments (step). At each different channel parameter value (line 4), the value is written into the SIF register (line 5), stored data read from the specified sector (sector number) is processed by the read channel based on the current channel parameter value (line 6), and a metric value is generated to characterize the performance of the read channel at that parameter value (line 7). After sweeping through all of the different channel parameter values, the "best" value is selected based on the different collected metric values (line 9) and then used for subsequent read-channel processing (line 10).

Optimization processor 110 has three components: optimization metric, optimization function, and optimization flow. The optimization metric is measure that gets minimized or maximized during the optimization process. The optimization function is the search or adaptation for a particular parameter (SIF register). The optimization flow defines the relationship between different optimization functions.

Although an embodiment has been described in which one or more on-chip optimization processors 110 are hardware based, in alternative embodiments, one or more on-chip optimization processors could be software and/or firmware based in addition to or instead of one or more hardware-based optimization processors.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain embodiments of this invention may be made by those skilled in the art without departing from embodiments of the invention encompassed by the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. Apparatus comprising a read/write chip for a hard disc drive having a read/write head, the chip comprising:
    a servo channel configured to control operations of the read/write head;
    a write channel configured to generate a write data signal used by the read/write head to store data on a hard disc of the hard disc drive;
    a read channel configured to process a read data signal generated by the read/write head to generate recovered data representative of the data stored on the hard disc; and
    at least one optimization processor that is part of at least one channel of the servo, write, and read channels and is configured to (i) analyze processing of the at least one channel for a plurality of different parameter values for one or more different channel parameters and (ii) select an optimal parameter value for each channel parameter.

2. The invention of claim 1, wherein the at least one optimization processor is a hardware-based processor.

3. The invention of claim 1, wherein the chip further comprises on-chip memory configured to store analysis and optimization scripts for the at least one optimization processor.

4. The invention of claim 1, wherein the chip further comprises a user interface that enables a user of the chip to write user data to and read user data from the hard disc, wherein the at least one optimization processor has access to channel processing data that is not available to the user using the user interface.

5. The invention of claim 1, wherein the at least one optimization processor is configured to optimize at least two of the read channel, the write channel, and the servo channel in parallel.

6. The invention of claim 1, wherein the at least one optimization processor is configured to detect unreliable channel processing and ignore results corresponding to the detected unreliable channel processing when selecting an optimal parameter value.

7. The invention of claim 6, wherein:
    the unreliable channel processing corresponds to one of a "missed sync" condition, a "false sync" condition, and a "media defect" condition; and
    the at least one optimization processor is configured to detect the unreliable channel processing by monitoring signals generated by the read channel indicating the occurrence of one or more of the three conditions.

8. The invention of claim 1, wherein the apparatus is the read/write chip.

9. The invention of claim 1, wherein the apparatus is the hard disc drive.

10. The invention of claim 1, wherein the apparatus is a consumer product comprising the hard disc drive.

* * * * *